United States Patent [19]

Fukuma et al.

[11] 4,201,935
[45] May 6, 1980

[54] METHOD AND APPARATUS FOR CONTROLLING THE FEED OF MACHINE TOOLS

[75] Inventors: Nobuo Fukuma, Toyota; Yoshito Kato, Aichi, both of Japan

[73] Assignee: Toyota Jidosha Kogyo Kabushiki Kaisha, Toyota, Japan

[21] Appl. No.: 760,010

[22] Filed: Jan. 17, 1977

[30] Foreign Application Priority Data

Jan. 16, 1976 [JP] Japan .................................. 51-4531
Sep. 3, 1976 [JP] Japan ........................... 51-119367[U]
Oct. 28, 1976 [JP] Japan ........................... 51-145011[U]

[51] Int. Cl.$^2$ .............................................. H02K 7/10
[52] U.S. Cl. .................................... 318/15; 318/612; 74/467; 74/609; 318/380; 318/626
[58] Field of Search ............... 318/380, 366, 487, 626, 318/39, 571, 375, 269, 15, 612; 74/608, 609, 467; 310/80

[56] References Cited

U.S. PATENT DOCUMENTS

| | | | |
|---|---|---|---|
| 1,350,540 | 8/1920 | Blood .................................... | 318/39 |
| 2,403,092 | 7/1946 | Lear ....................................... | 74/467 |
| 2,553,409 | 5/1951 | Frank ................................... | 318/375 |
| 2,816,566 | 12/1957 | Warren ................................. | 74/608 |
| 3,278,774 | 10/1966 | Roller et al. ........................... | 310/80 |
| 3,795,853 | 3/1974 | Whitehouse ......................... | 318/626 |

Primary Examiner—Gene Z. Rubinson
Assistant Examiner—Eugene S. Indyk
Attorney, Agent, or Firm—Koda and Androlia

[57] ABSTRACT

An improved feed for a D.C. motor driven feed including a feed screw and nut which moves the table of a machine tool through predetermined positions in accordance with orders to change the rate of feed. The improved feed includes a power damping circuit, a switching circuit for electrically coupling the power damping circuit for a predetermined length of time to the D.C. motor whenever there is an order to change the rate of feed, thrust bearings provided in the D.C. motor whereby loads applied to the table are borne by the thrust bears and a cylindrical protective cover coupled to the nut and covering the feed screw such that the bottom inside surface of the cover is in relative near proximity to the feed screw and the top inside surface of the cover is in relative far proximity to the feed screw.

2 Claims, 8 Drawing Figures

U.S. Patent  May, 6, 1980  Sheet 1 of 2  4,201,935
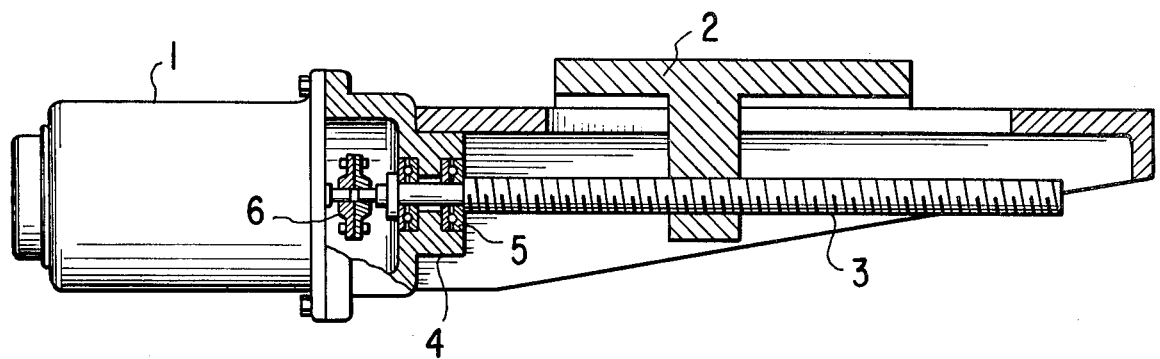
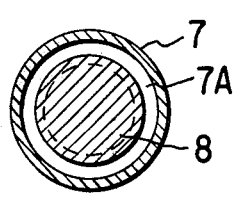 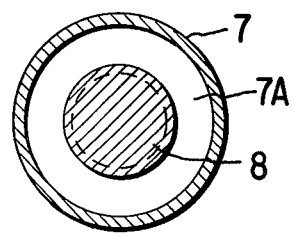
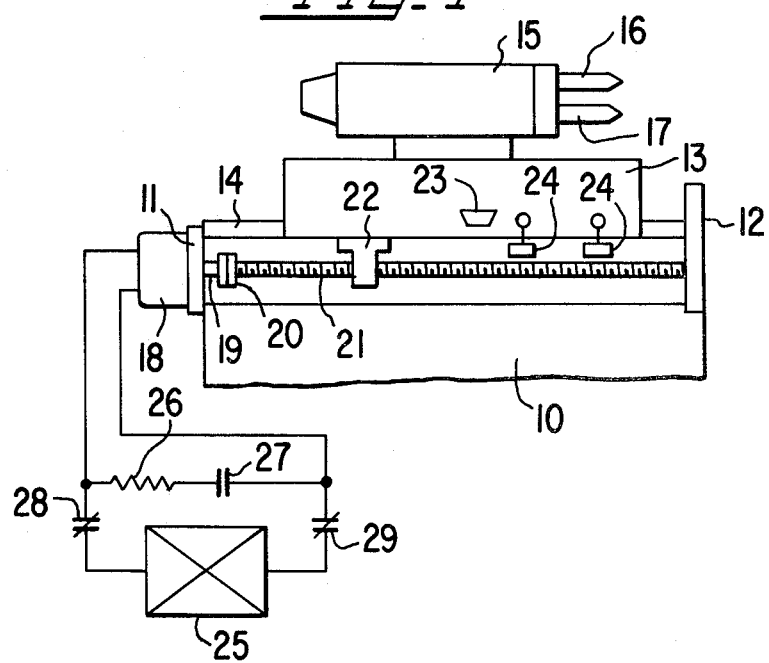

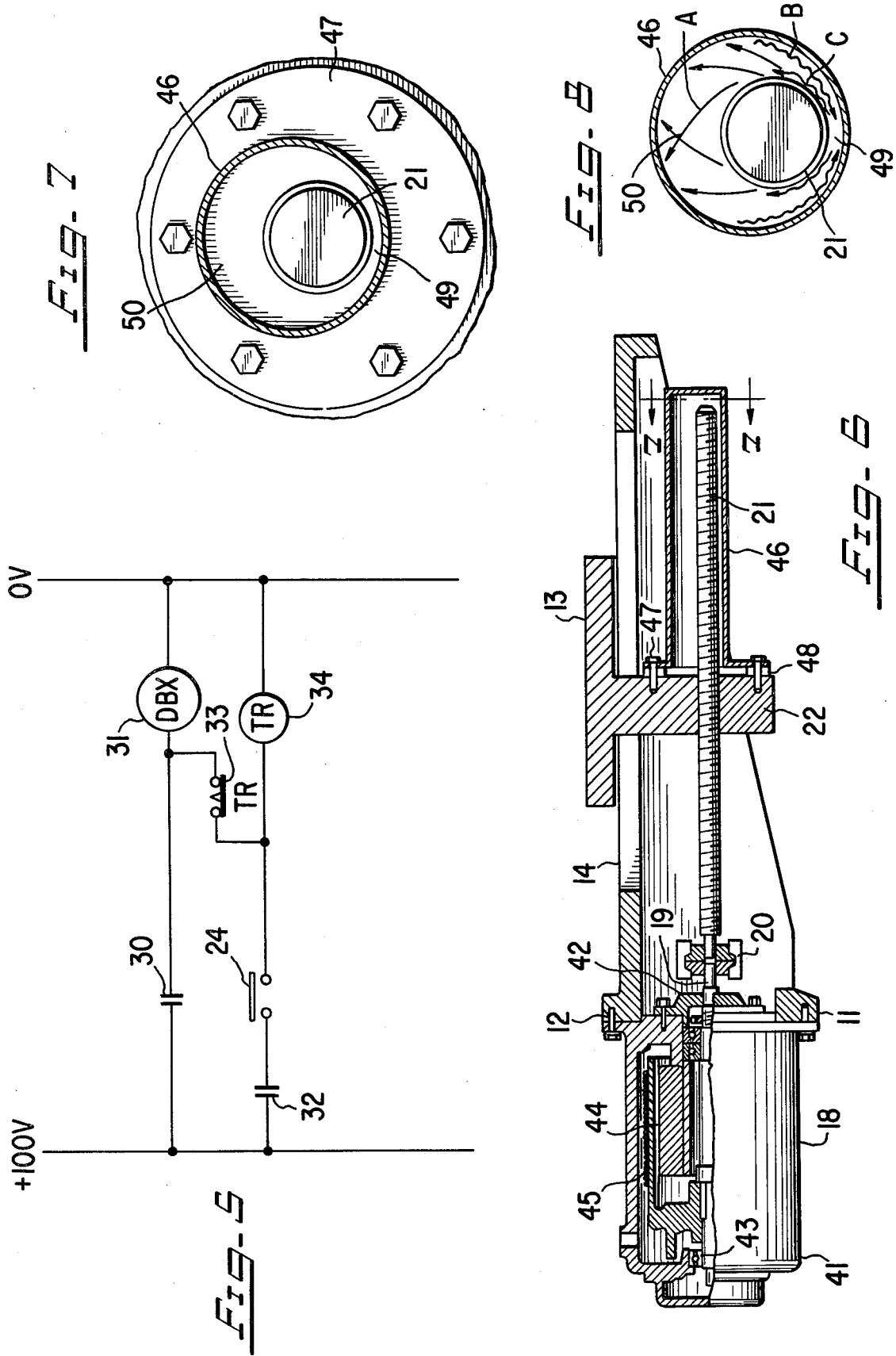

METHOD AND APPARATUS FOR CONTROLLING THE FEED OF MACHINE TOOLS

BACKGROUND OF THE INVENTION

1. Field of Invention

This invention relates to screw feeds for machine tools and in particular to a D.C. motor driven screw feed for the table of a machine tool.

2. Prior Art

D.C. motor driven screw type table feeds for machine tools are well known. Along with hydraulic means, these D.C. motor driven feed apparatuses have superior characteristics as apparatuses for controlling the feed of machine tools.

As shown in FIG. 1, conventional feed driving motors cause a feed screw 3 to revolve via a coupling 6, but do not contain any thrust bearings which are able to bear a load. Instead, the load of the thrust which accompanies the linear motion of the slide 2 acts upon the feed screw 3 and is borne by the thrust bearings 5 installed in column 4 so that the load does not act upon the feed driving motor 1. Such conventional installation of thrust bearings 5 in column 4 have the following disadvantages: It increases the overall number of parts in the feed and it makes maintenance of the feed complicated and difficult.

Furthermore, conventional motor driven feeds have an additional problem in that the feed screw collects dirt and requires lubrication and therefore must be provided with a protecting cover. Conventional methods for protecting the feed screws of machine tools, etc. have consisted of protecting the feed screw indirectly by placing a cover over the entire feed slide mechanism or covering the circumference of the feed screw with a helical spring type cover described in Japanese Pat. No. 638,408. Such a helical spring type cover is commercially referred to as "elasticone".

In such configurations, however, the feed screw is not completely protected and no consideration whatever has been given to lubrication of the feed screw. Conventional protective covers in which consideration has also been given to lubrication of the feed screw as shown in FIGS. 2 and 3. In these protective covers 7, the central axis of the cover 7 coincides with the central axis of the screw 8 so that a so-called grease pocket 7A is formed by the space between the cover 7 and the feed screw 2. If grease, for example, is used as a lubricant for the feed screw 8, this grease is dispersed by a centrifugal force ans the feed screw 8 revolves. Accordingly, it is desirable that the volume of the grease pocket be small, as shown in FIG. 2, in order to keep the grease stored inside the protective cover 7 in constant contact with the feed screw 8 so that sufficient lubrication action is obtained. On the other hand, however, when the volume of the grease pocket is small, the heat capacity of the contained grease is small so that the grease is easily liquified. Since the absolute quantity of grease is small, it becomes necessary to frequently replenish the grease. Accordingly, a conflict arises since it is also desirable that the volume of the grease pocket be large, as shown in FIG. 3. Thus, conventional protective covers for feed screws have suffered from a drawback in that in these covers it is difficult to adequately solve both the problem of centrifugal force acting upon the lubricant and the problem of heat capacity.

In addition, conventional D.C. motor control apparatuses with motor driven screw feeds which lack positional feedback have a particular drawback. This drawback is its inability to correspond well to the rate changing device. Specifically, although the rate of feed of the table is changed on account of a reduction in cycle time, during feed movement these apparatuses have not been able to immediately cause the rate of revolution of the D.C. motor to conform to the rate ordered when an order to change the rate is sent to the D.C. motor. It is well known that the ability to respond is especially poor in cases where the inertia and weight of the table which includes the main shaft unit or work table are great. Accordingly, conventional rate changing orders for which conventional limit switches are employed have caused drawbacks such as table overdrive, etc.

This invention has been designed with the above described conventional problems in mind.

SUMMARY OF THE INVENTION

Accordingly, it is a general object of the present invention to provide a feed for machine tools whose characteristics include a superior ability to respond to rate change orders.

It is yet another object of the present invention to provide an apparatus a feed for machine tools which is relatively easy to manufacture and relatively low in cost.

It is still another object of the present invention to provide a feed which is easy to maintain.

It is yet another object of the present invention to provide a feed with a protective cover which improves lubrication and provides complete protection for the feed screw from its surrounding environment.

In keeping with the principles of the present invention, the objects are accomplished by a unique improved feed for a D.C. motor driven screw feed and nut which moves the table of a machine tool through predetermined positions in accordance with orders to change the rate of feed. The improved feed includes a power damping circuit, a switching circuit for electrically coupling the power damping circuit for a predetermined length of time to the D.C. motor whenever there is an order to change the rate of feed, thrust bearings provided in the D.C. motor whereby loads applied to the table are borne by the thrust bearings and a cylindrical protective cover coupled to the nut covering the feed screw such that the bottom inside surface of the cover is in relative near proximity to the feed screw and the top inside surface of the cover is in relative far proximity to the feed screw.

BRIEF DESCRIPTION OF THE DRAWINGS

The above mentioned and other features and objects of the present invention will become more apparent by reference to the following description taken in conjunction with the accompanying drawings, wherein like reference numerals denote like elements, and in which:

FIG. 1 is a partial cross-sectional front view which illustrates a conventional feed device;

FIG. 2 is a cross-section which illustrates the relationship between the feed screw and conventional protective covers;

FIG. 3 is a cross-section which illustrates the relationship between feed screws and conventional protective covers;

FIG. 4 is a rough structural diagram of a feed control device in accordance with the teachings of the present invention; and FIG. 5 is a diagram of a control cricuit of the present invention;

FIG. 6 is a partial cross-sectional front view of a feed device in accordance with the teachings of the present invention;

FIG. 7 is a cross-section looking along the lines 7—7 in FIG. 6 which illustrates the relationship between the feed screw and the protective cover of the present invention; and FIG. 8 is a cross-sectional view illustrating the circulation of grease in a protective cover in accordance with the teachings of the present invention.

DESCRIPTION OF THE INVENTION

Referring more particularly to the drawings, shown in FIG. 4 is a rough structural diagram of a feed control apparatus in accordance with the teachings of the present invention. In FIG. 4, supporting side plates 11 and 12 are attached to a base 10 of the machine tool. A slide base 14 which supports the movement of table 13 is coupled to both side plates 11 and 12. In this embodiment, a main shaft bed 15 is attached to table 13 and spindles 16 and 17 are provided so that they are free to rotate on the tip of main shaft bed 15.

DC motor 18 is coupled to supporting side plate 11. The main shaft 19 of DC motor 18 is coupled to feed screw 21 via coupling 20. Feed screw 21 engages with a feed nut 22 fixed to table 13 such that the table is moved left and right along the slide base 14. A switch actuator 23 is attached to table 13. Rate change orders corresponding to the position of table 13 are obtained by means of a contact between actuator 23 and limit switches 24 which are provided adjacent to table 13. DC motor 18 is controlled by DC motor driving circuit 25 and a power damping circuit including a damping resistor 26 and contacts 27, 28 and 29 are electrically coupled to the DC motor 18.

Referring to FIG. 5, shown therein is a switching circuit for the power damping circuit. Since damping of the DC motor 18 is also necessary when the table 13 is stopped, a stop signal switch 30 and a damping reed relay 31 are connected in series. The stop signal switch 30 is not shown in FIG. 4 but may be made from any conventional limit switch. Damping reed relay 31 controls the on-off condition of contacts 27, 28 and 29 shown in FIG. 4. Contact 27 is normally open while contacts 28 and 29 are normally closed.

A second switching control circuit is connected to the damping reed relay 31 in parallel with the stop signal switch 30. This circuit consists of a normal revolution signal contact 32, a rate change order limit switch 24 and a timer contact 33. The on-off condition of timer contact 33 is controlled by a timer relay 34 connected in series with the limit switch 24. The normal revolution signal contact is closed during normal revolution when the table is fed from left to right as shown in FIG. 4 and is open during reverse movement of the table so that the power damping switching circuit has no effect upon the operation of the DC motor 18. Timer relay 34 switches contact 33 to the on condition for a prescribed period of time after receiving an activating input signal. The period of time for which timer relay 34 is set is optional. In this embodiment, timer relay 34 is set for a period of time of approximately 0.1 seconds.

In operation, during normal feed of table 13, the damping reed relay 31 is in an unactivated condition so that the power damping circuit has no effect upon the operation of the DC motor 18. Accordingly, the DC motor 18 revolves normally. When the table 13 reaches a rate change position, the actuator 23 switches the limit switch 24 on. As a result of this, the timer relay 34 in FIG. 5 is supplied with an activating input signal via the normal revolution signal of contact 32 and limit switch 24 such that contact 33 is switched to on for a prescribed period of time. Since the damping reed relay 31 is activated when the timer contact 33 is switched on, the contact 27 of FIG. 4 is switched on and the contacts 28 and 29 are switched off. The input voltage to the DC motor 18 is cut off by the action of the switching circuit.

At the instant the input voltage to the DC motor is cut off, the motor 18 is still revolving in the same direction; but since the supplied voltage becomes zero, a reverse electromotive force causes current to flow through the damping resistor 26. Accordingly, a reverse torque acts to cause rapid damping. Thus, in the present invention, the motor is made to act as a generator during damping. Accordingly, the mechanical energy of the rotating parts can be converted into electrical energy and dissipated as heat in the damping resistor 26 and a strong damping force can be obtained, particularly when the DC motor 18 is revolving at a relatively high rate. The damping motion is completed when the period of time for which the timer relay 34 has been set has elapsed. The table 13 is then again fed at a new changed rate by the direct current motor 18 which is controlled by the driving circuits 25.

Either a series wound DC motor with superior power dampening characteristics or a double wound DC motor with series wound characteristics would be appropriate for use with the present invention. In addition, the driving circuit 24 can be any well known circuit of the prior art for controlling DC motors.

Referring to FIG. 6, shown therein is a detailed partial cross-sectional view illustrating a feed device in accordance with the teachings of the present invention. In FIG. 6, the feed driving motor 18 is coupled to slide base 14 via side supporting plates 11 and 12. The shaft 19 of feed driving motor 18 is supported by double mounted thrust bearings 40 which are mounted in the casing 41 and restrained by a plate 42. The other end of shaft 19 is supported by radial thrust bearing 43 which is provided in the rear of casing 41. A parnet magnet 44 is provided in casing 41 and a coil wound rotor 45 is coupled to shaft 19.

Furthermore, the shaft 19 is directly coupled to the feed screw 21 via a rigid coupling 20. The feed screw 21 engages with the cable 19 which slides along the slide base 14.

A protective cover 46 for feed screw 21 which is in the shape of a flanged cylinder which is open at one end and closed at the other end is coupled to one side of nut 22. Protective cover 46 is coupled to nut 22 by bolting the flanged end 47 of protective cover 46 to nut 22. A gasket 48 is interposed between flanged end 47 and nut 22. Furthermore, as shown in FIG. 7, the protective cover 46 is coupled to the nut 47 such that a small space 49 is formed between the bottom of screw 21 and the bottom inside surface of cover 46 and a large space 50 is formed between the top of screw 21 and the bottom inside surface of cover 46. Therefore, a large grease pocket is formed in space 50 and a small grease pocket is formed in space 49.

In operation, the feed driving motor 18 causes the shaft 19 to revolve in accordance with signals from an external source. The revolution of shaft 9 is transmitted to the feed screw 21 via the coupling 20. Since the coupling 20 forms a rigid connection between the shaft 19 and the feed screw 21, the shaft 19 and the feed screw 21 may be considered to revolve as an integral unit without any play between the two. Furthermore, the revolution of feed screw 21 is transmitted via engagement with nut 22 to the table 13 so that the table is caused to slide along the slide base 14. The load generated in the direction of slide by the sliding motion of the table 13 acts as a thrust load upon the feed screw 21. This thrust load is transmitted without change via the coupling 20 to the shaft 19. The thrust load acting on shaft 19 is borne by the thrust bearings 40.

Furthermore, it is also desirable that the thrust bearings 40 be also designed to bear radial load along with the thrust load. Accordingly, angular bearings or tapered roller bearings would be appropriate. In such a case, the inventor has demonstrated in experiments that the bearings are thoroughly able to bear a thrust load of two or three tons, which is the load capacity of the bearing.

As shown in FIG. 8, when feed screw 21 is caused to revolve by the driving motor, not shown in the figure, the grease is caused to adhere to the interior wall of the protective cover 46 by centrifugal force (as indicated by arrow A). Then, as a result of a reduction in viscosity due to generated heat, gravity causes the grease to move from the large space 41 in the upper portion to the smaller space 49 in the lower portion (as indicated by the arrow B). This movement of grease causes the grease in the small space 49 to adhere to the feed screw 21. The grease adhering to the screw 21 is again dispersed by centrifugal force toward the interior wall of the protective cover 46 (as indicated by arrow C). Thusly, the grease is circulated so that thorough lubrication is accomplished.

Furthermore, it should be apparent that although the thrust bearing 40 was described as a double mount, a single self-centering roller bearing, etc. could also be used so long as it is able to withstand a substantial thrust load in both longitudinal and radial directions. In addition, since the coupling 20 forms a rigid connection between the shaft 19 and the feed screw 21, it would be possible to combine the shaft 19 and the feed screw 21 into a single unit thereby eliminating the coupling 20. Also, even though in the above description the protective cover 46 is cylindrical, a hollow part other than a cylinder could also be used providing (a) that it can contain a lubricant, (b) that the space between the protective cover 46 and the lower portion of the circumference of the feed screw 21 is small, (c) that the space between the cover 46 and the upper portion of the feed screw 21 is large and (d) that the grease can be moved by gravity.

As has been described above, this invention provides for thrust bearings installed within the feed driving motor, a protective cover for the screw feed and a means for improving the controllability of the D.C. motor. The above described feed overcomes the difficulties of the prior art and provides the following advantages: (a) the rate changing response of the D.C. motor is improved, (b) a high precision feed control system is provided, (c) the cost of the feed is decreased, (d) maintenance of the feed is simplified, (e) the heat capacity of the lubricant in the protective cover is maintained at a high level, (f) the lubricant is kept in constant contact with the feed screw, (g) the feed screw is completely protected from its surrounding environment, and (h) adequate long-lasting lubrication of the feed screw is provided.

In all cases it is understood that the above described embodiment is merely illustrative of but one of the many possible specific embodiments which represent the applications of the principles of the present invention. Numerous and varied other arrangements can be readily devised by those skilled in the art in accordance with these principles without departing from the spirit and scope of the invention.

We claim:

1. An improved D.C. motor driven feed including a screw and nut which moves the table of a machine tool through predetermined positions in accordance with orders to change the rate of feed, said apparatus comprising:
   a power damping circuit;
   a switching circuit for electrically coupling said power damping circuit to said D.C. motor for a predetermined time whenever there is an order to change the rate of feed; and
   a cylindrical protective cover having a central axis coupled to said nut and covering said feed screw such that a central axis of said feed screw is displaced to one side of said central axis of said protective cover and a bottom inside cylindrical surface of said cover is in relative near proximity to the feed screw and the top inside cylindrical surface of said cover is in relative far proximity to said feed screw.

2. An improved D.C. motor driven feed including a screw and nut which moves a table of a machine tool through predetermined positions in accordance with orders to change the rate of feed, said apparatus comprising:
   a power damping circuit;
   a switching circuit for electrically coupling said power damping circuit to said D.C. motor for a predetermined time whenever there is an order to change the rate of feed;
   thrust bearings provided in said D.C. motor; and
   cylindrical protective cover having a central axis coupled to said nut and covering said feed screw such that a central axis of said feed screw is displaced to one side of said central axis of said protective cover and a bottom inside cylindrical surface of said cover is in relative near proximity to the feed screw and the top inside cylindrical surface of said cover is in relative far proximity to said feed screw.

* * * * *